Patented May 17, 1927.

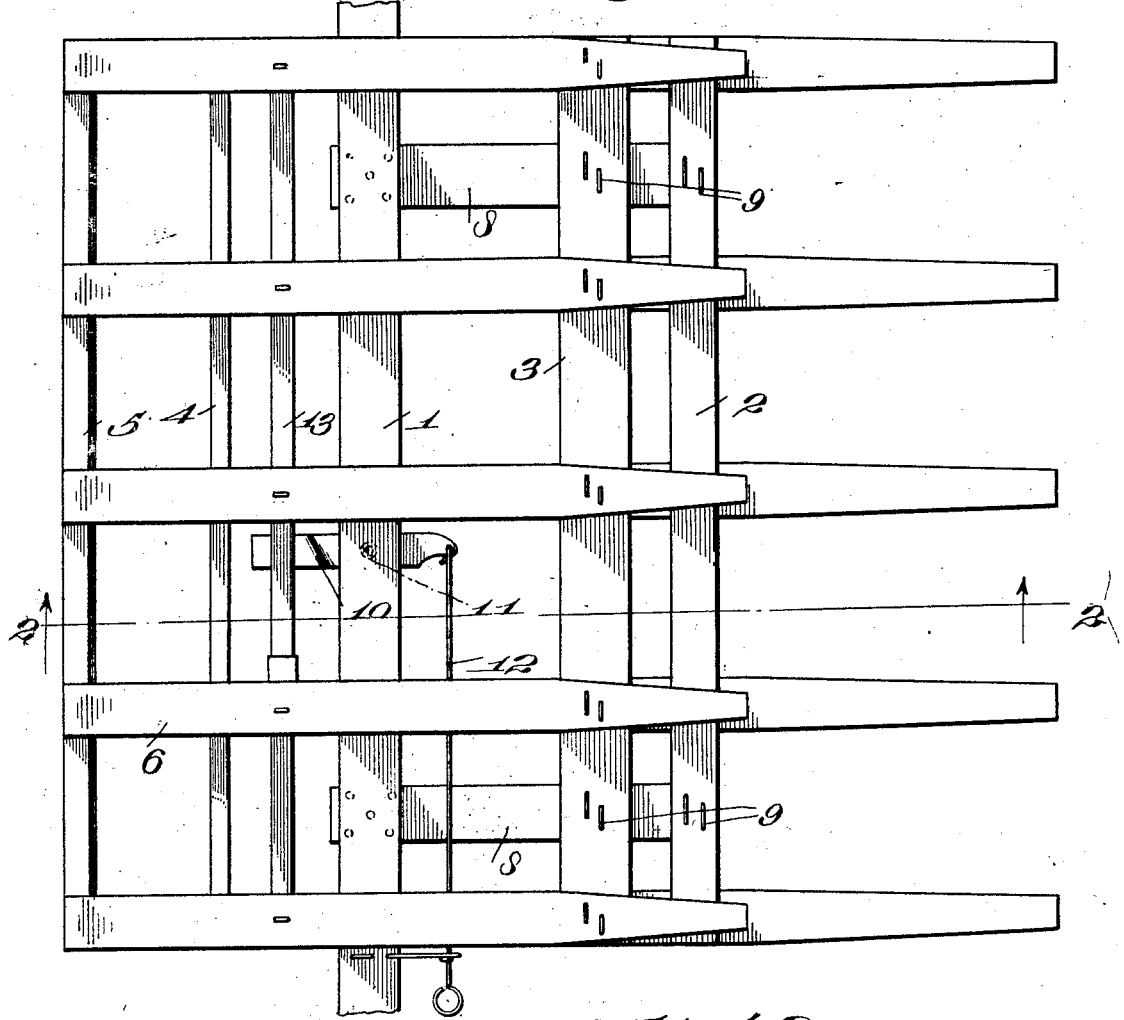

1,628,940

UNITED STATES PATENT OFFICE.

JACOB WENGER, OF HIGHLAND, ILLINOIS.

WING CONSTRUCTION FOR AIRPLANES.

Application filed January 7, 1925. Serial No. 1,082.

This invention relates to improvements in aircraft particularly of the heavier-than-air type, and it consists of the constructions, combinations and arrangements herein described and claimed.

An object of the invention is to provide an airplane wing the leading edge of which is adjustably vibratory for the purpose of producing a definite pulling action in a manner fully defined below.

Another object of the invention is to provide an airplane wing which is so mounted as to permit free vibratory movement of the wing from the leading edge to the trailing edge, there being means for so uniformly diminishing the amplitude of vibration that the amount of forward pull can be regulated to a nicety.

Another object of the invention is to provide a novel aerofoil construction and suspension by means of which certain natural phenomena may be so utilized as to derive useable power.

Other objects and advantages will appear from the following specification, reference being had to the accompanying drawings, in which—

Figure 1 is a plan view of a portion of an airplane wing, the covering being omitted to illustrate the framework.

Figure 2 is a cross section taken substantially on the line 2—2 of Figure 1.

Figure 3 is a detail perspective view of a portion of the bracket bars upon which are mounted the springs which assist in controlling the vibration of the leading edge.

A brief introductory description will assist in the understanding of the purpose of the invention. The question of soaring flight by heavier-than-air gliders has received considerable attention from time to time, and has been the subject of no little experimentation. The results of such experimentations have in some instances been reported as being good. The subject of the invention is to a considerable extent based upon that peculiar natural phenomena in which alternate whirls of air occur at the sides of a suitably suspended aerofoil body, resulting in a waving or sinuous motion of the body and demonstrating the pulling effect at the suspension place.

Observations of such birds that have the characteristics of soaring while in flight have furnished a forceful illustration that very little power is necessary for prolonged flight. One of the occasions noted in these observations was that of a hawk circling in a 10 to 15 mile downhill wind with no perceptible wing movement. It is a popular belief that either rising currents of air or intermittent winds are necessary for such soaring or circling performances, but the occasion mentioned refutes this belief. Another feature noted is the familiar waving of a flag or other flexible body. This waving is produced by anchoring the flag so that the wind blows past. The passage of wind causes alternate whirls of air to form on opposite sides of the flag, and as these whirls move toward the free end of the flag a waving motion is seen to result.

These whirls appear to roll upon the surface of the flag but produce a drag thereupon. However, in the case of an aerofoil structure, favorably suspended, the action of the air produces a forward pull, thereby providing a source of power which is available not only to aircraft of appropriate kinds, but also to other applications. In the case of airplane wings the whirls of air will differ from the whirls which wave a flag, but nevertheless the whirls are present and incidentally act so as to reduce the surface friction of the wing.

The foregoing observations resulted in the formulation of a theory and the making of models of airplane wings with which experiments were conducted. One wing model demonstrated an ability to exert a pull equal to its own weight in a 30 to 35 mile wind but was found to vibrate excessively. Another model exhibited a strong smooth pull under similar conditions, but when mounted on a frame and appropriately guyed the pull was found to disappear. The theory evolved is this, that the wing must be permitted to vibrate within certain bounds while being mounted upon its usual supports. This vibration is ordinarily imperceptible, but it is, nevertheless, a controlling factor in determining the pulling power of the wings. The ability to adjust the amplitude of vibration is equally as important as working out an appropriate mounting for the vibratory wings. It is important that the regulation of vibration be confined to the leading edge of the wing, but the zone of vibration occupies the entire wing. Vibrations produced at the leading edge are transmitted to the trailing edge. The vibration occurs at right angles to the mean plane of the wing. These vibrations create whirls alternately above and below the wings, the effect being a "flapping" motion of the wing.

Consider now the construction: This, according to the drawing, is in its simplest form. It is anticipated that the internal construction of actual aeroplane wings will be quite different from that illustrated, but regardless of such construction those features which make possible the operation of the foregoing theory will have to be adhered to in substance.

The bar 1 is the main support of the wing or aerofoil. Truss bars 2, 3 and 4 and the shunt spar 5, the latter forming the leading edge of the wing, are of such shape and arrangement as to properly preserve the curvature of the upper and lower ribs 6 and 7. It is upon these that the usual covering material is applied.

Extending rearwardly from the main wing support bar 1 are carriers 8. It is to these that the truss bars 2 and 3 are secured at 9, and it is these that provide a flexible mounting upon which the wing structure may vibrate when permitted to do so. The amplitude of this vibration is controlled by a lever 10 which is pivoted at 11 upon the support bar 1 and has a rod 12 which extends off to a place where it may be either manually or automatically operated, and when the levers 10 (for a number are employed in the entire wing) are released the vibration of the trailing edge is greater than that at the leading edge.

Each of a pair of bracket bars 13 carry springs 14 which converge from their places of attachment 15 to the bracket bars. These springs define a tapering passage 16 into which the free end of the lever 10 extends and in which said free end is movable upon operation of the bar 12. The free end of the lever is bent upon itself at 17 or otherwise formed to produce an enlargement which will have a wedging effect on the springs 14 when forced into the tapering passage. The extremities of the springs are curled over at 18 (Fig. 3) so as to contact the adjacent bracket bars as shown.

*The operation.*

The main support bar 1 must be regarded as being rigid. The carriers 8 extend backward and have attached thereto through the medium of the truss bars 2 and 3 all of the wing structure, that is to say the remaining truss bars and the ribs. The carriers 8 possess a degree of flexibility, and were the leading edge of the wing totally unrestrained, it would be capable of considerable vibration.

In fact, such vibrations can occur when the lever 10 has been so moved that the enlarged end 17 occupies the largest part of the passage 16, but at such time, as stated before, the vibration of the trailing edge will exceed that of the leading edge. This vibration will produce a definite forward pull and speed of flight, and if, for any reason the speed of the craft to which the wing is attached increases the aforesaid vibration of the leading edge will increase and result in a drag on the wing. It is then that the lever 10 is moved so that the enlarged end 17 enters the tapering passage 16.

This will reduce the amplitude of vibration of the leading edge and permit a higher speed of the craft. When the lever 10 is moved to the extremity of the passage 16 all vibration of the leading edge will practically be stopped so that the leading edge becomes substantially rigid. From this description it will be understood that the wing practically floats about its main support 1. The degree to which this floating is permissible is uniformly adjustable by the lever 10, and when the lever 10 has been moved to the one extremity the otherwise free leading edge of the wing becomes locked upon the support bar 1. The degree of resiliency possessed by the carrier 8 is also a determining factor of the freedom with which the leading edge 5 may vibrate.

The aerofoil construction and suspension herein disclosed is not confined to aeroplane use, but is applicable to other vehicles. For example, an aerofoil structure mounted upon arms rigidly connected to a shaft will effect a forward pull and cause a rotary motion of the shaft when permitted to occupy a place in the wind. The presence of free power is evidenced, and it is only necessary to provide simple means for harnessing it.

While the construction and arrangement of the improved airplane wing is that of a generally preferred form, obviously modifications and changes may be made without departing from the spirit of the invention or the scope of the claims.

I claim:

1. An airplane wing having a relatively fixed support, means constituting a mounting for the wing being rigidly secured to the support and permitting free vibration of the wing, and means including a lever carried by the support being so movable in respect to parts of the wing as to progressively regulate the freedom with which said vibrations may take place.

2. An airplane wing having a relatively fixed support, carriers rigidly attached to the support and providing a yieldable mounting for the wing so that the leading edge is capable of vibration, means carried by the wing adjacent to the leading edge and defining a tapering passage, and a lever carried by the support which is movable in said passage to control the degree of vibration according to its position therein.

3. An airplane wing having a relatively rigid support bar, yieldable carriers fixed upon the support bar and extending toward the trailing edge of the wing, means including truss bars forming part of the wing structure at which the wing is mounted upon the carriers, the leading edge being unsupported and free to vibrate, a pair of converging members carried by the wing structure defining a tapering passage, and a lever movably mounted upon the support bar having one end traversible in said passage to regulate the amplitude of vibration according to its position therein.

JACOB WENGER.